(12) United States Patent
Gu et al.

(10) Patent No.: US 10,966,050 B1
(45) Date of Patent: Mar. 30, 2021

(54) SYSTEMS AND METHODS FOR VIRTUAL BOUNDARY ENFORCEMENT USING NETWORK FILTERS

(71) Applicant: Symantec Corporation, Mountain View, CA (US)

(72) Inventors: Lei Gu, Bedford, MA (US); Ilya Sokolov, Boston, MA (US)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 16/219,677

(22) Filed: Dec. 13, 2018

(51) Int. Cl.
*H04W 4/021* (2018.01)
*H04W 4/02* (2018.01)
*H04L 29/06* (2006.01)
*H04L 12/26* (2006.01)

(52) U.S. Cl.
CPC .......... *H04W 4/021* (2013.01); *H04L 43/04* (2013.01); *H04L 63/0245* (2013.01); *H04L 63/20* (2013.01); *H04W 4/023* (2013.01)

(58) Field of Classification Search
CPC ..... H04W 4/021; H04W 4/029; H04W 4/023; H04L 63/0245; H04L 43/04; H04L 63/20
See application file for complete search history.

(56) References Cited

U.S. PATENT DOCUMENTS

| | | | | |
|---|---|---|---|---|
| 9,788,153 | B1* | 10/2017 | Newstadt | G06F 3/1219 |
| 2012/0284769 | A1* | 11/2012 | Dixon | H04W 4/021 |
| | | | | 726/1 |
| 2016/0007151 | A1* | 1/2016 | Birch | H04M 1/72572 |
| | | | | 455/456.3 |
| 2017/0332330 | A1* | 11/2017 | Dhandu | H04W 64/006 |
| 2018/0184239 | A1* | 6/2018 | Bestor | G06K 9/00771 |
| 2018/0343538 | A1* | 11/2018 | Bastide | H04W 12/00503 |
| 2020/0092678 | A1* | 3/2020 | Pagett | H04L 67/18 |

OTHER PUBLICATIONS

Apple, "NetworkExtension", URL: https://developer.apple.com/documentation/networkextension/, retreived on Mar. 19, 2019, 2 pages.

* cited by examiner

*Primary Examiner* — Marcus Hammonds
(74) *Attorney, Agent, or Firm* — FisherBroyles, LLP

(57) ABSTRACT

The disclosed computer-implemented method for virtual boundary enforcement using network filters may include (i) applying a network filter to network traffic associated with a target computing device, (ii) analyzing data generated by the network filter, (iii) identifying, based on an analysis of the data, a potential violation of a virtual boundary associated with the target computing device, and (iv) in response to identifying the potential violation, performing a security action to enforce the virtual boundary associated with the target computing device. Various other methods, systems, and computer-readable media are also disclosed.

18 Claims, 7 Drawing Sheets

SYSTEMS AND METHODS FOR VIRTUAL BOUNDARY ENFORCEMENT USING NETWORK FILTERS

BACKGROUND

In the information age, parents may wish to monitor the activity and social interactions of their children remotely. For example, parents may use geofencing solutions to monitor the location of their children remotely. Parents may set physical boundaries for the geofence to be limited to their home. However, current geofencing solutions often require a minimum radius of 150 to 200 meters. Such a large radius may not be able detect when the child has exited the boundaries of the established geofence, such as going outside of the home or visiting a neighbor's house. Similarly, parents may wish to remotely monitor the social interactions of the child, such as who they are spending time with when they are outside of the home. Unfortunately, existing solutions may not be capable of consistently identifying people physically near the child for extended periods of time. Additionally, the computing device that may be used to monitor the activity and social interactions of the child may not allow applications to execute continuously in the background to prevent battery depletion or processing capabilities of the computing device. The instant disclosure, therefore, identifies and addresses a need for systems and methods for virtual boundary enforcement using network filters.

SUMMARY

As will be described in greater detail below, the instant disclosure describes various systems and methods for virtual boundary enforcement using network filters.

In one example, a method for virtual boundary enforcement using network filters may include (i) applying a network filter to network traffic associated with a target computing device, (ii) analyzing data generated by the network filter, (iii) identifying, based on an analysis of the data, a potential violation of a virtual boundary associated with the target computing device, and (iv) in response to identifying the potential violation, performing a security action to enforce the virtual boundary associated with the target computing device.

In some examples, the virtual boundary may include a geofence associated with the target computing device and the data may include global positioning system (GPS) data associated with the target computing device, data indicative of a wireless signal strength of the target computing device, or data indicative of a cellular signal strength of the target computing device. The security action may include (i) determining, based on the analysis of the data, that the target computing device has exited an established geofence and (ii) presenting, to a user of a different computing device, a notification that the target computing device has exited the established geofence. In some examples, the virtual boundary may include a social fence associated with the target computing device. The social fence may identify people or user devices permitted to be within a predetermined distance of the target computing device. The data may include at least one of an audio clip, a video clip, or a picture. The security action may include (i) determining, based on the analysis of the data, that an unidentified person or user device is within the predetermined distance of the target computing device and (ii) presenting, to a user of a different computing device, a notification that the target computing device has violated the social fence. In some examples, a request may be received to add the unidentified person or user device to the social fence. In response to receiving the request, the unidentified person or user device may be added to the social fence. In some examples, the method may include (i) uploading tasks to a shared location, (ii) detecting that the network filter has been applied to the network traffic, and (iii) in response to detecting that the network filter has been applied to the network traffic, executing the tasks in the shared location.

In one embodiment, a system for virtual boundary enforcement using network filters may include at least one physical processor and physical memory that includes computer-executable instructions that, when executed by the physical processor, cause the physical processor to (i) apply a network filter to network traffic associated with a target computing device, (ii) analyze data generated by the network filter, (iii) identify, based on an analysis of the data, a potential violation of a virtual boundary associated with the target computing device, and (iv) in response to identifying the potential violation, perform a security action to enforce the virtual boundary associated with the target computing device.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) apply a network filter to network traffic associated with a target computing device, (ii) analyze data generated by the network filter, (iii) identify, based on an analysis of the data, a potential violation of a virtual boundary associated with the target computing device, and (iv) in response to identifying the potential violation, perform a security action to enforce the virtual boundary associated with the target computing device.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
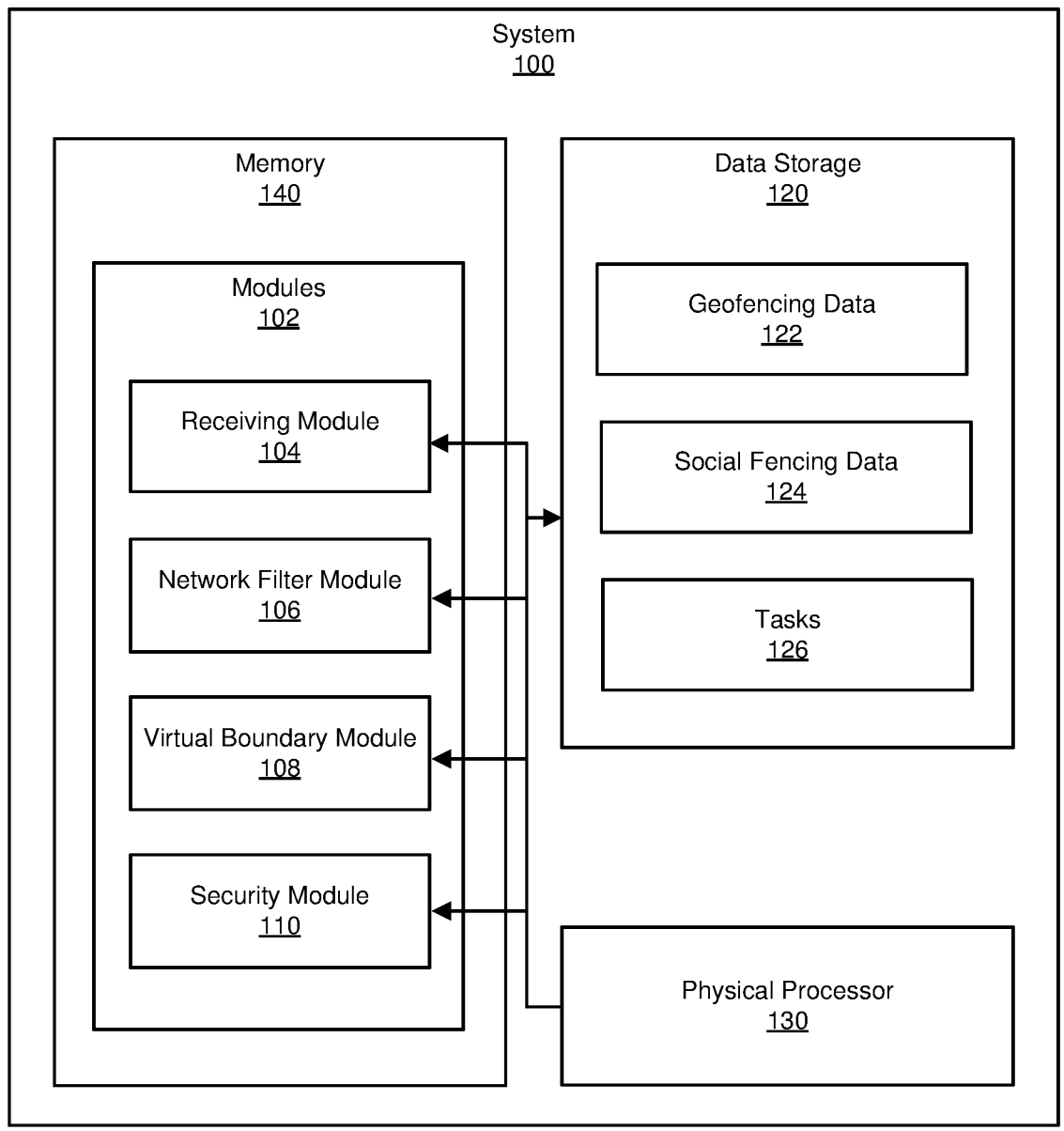
FIG. 1 is a block diagram of an example system for virtual boundary enforcement using network filters.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for virtual boundary enforcement using network filters. As will be described in greater detail below, network filters may be used to monitor and enforce virtual boundaries associated with computing devices. For example, the systems disclosed herein may apply network filters to network traffic associated with a computing device. As a network filter is applied to the network traffic, the disclosed systems may execute custom logic upon the network traffic. For example, when used in connection with a geofence, a network filter may track the current location of the computing device at regular intervals to ensure the computing device is within the boundaries of the geofence. By using the network filter to obtain the position of the computing device based on data of the network traffic, the systems described herein may enforce the geofence at a higher precision than existing solutions.

Similarly, for social fencing (e.g., managing social interactions with people), a network filter may utilize a microphone and/or camera of the computing device to obtain audio and/or video clips at regular intervals and analyze the content to identify people near the computing device. The disclosed systems may then compare identified individuals with a list of permitted people and/or devices and then enforce the social fence to ensure that unapproved people and/or devices are not within a predetermined distance of the computing device for an extended period of time. If the systems and methods described herein identify a potential violation of a virtual boundary, a security action may be performed as part of the enforcement of the virtual boundary. For example, a warning message may be transmitted to a different computing device with an alert including information about the potential violation of the virtual boundary.

Figure 2:
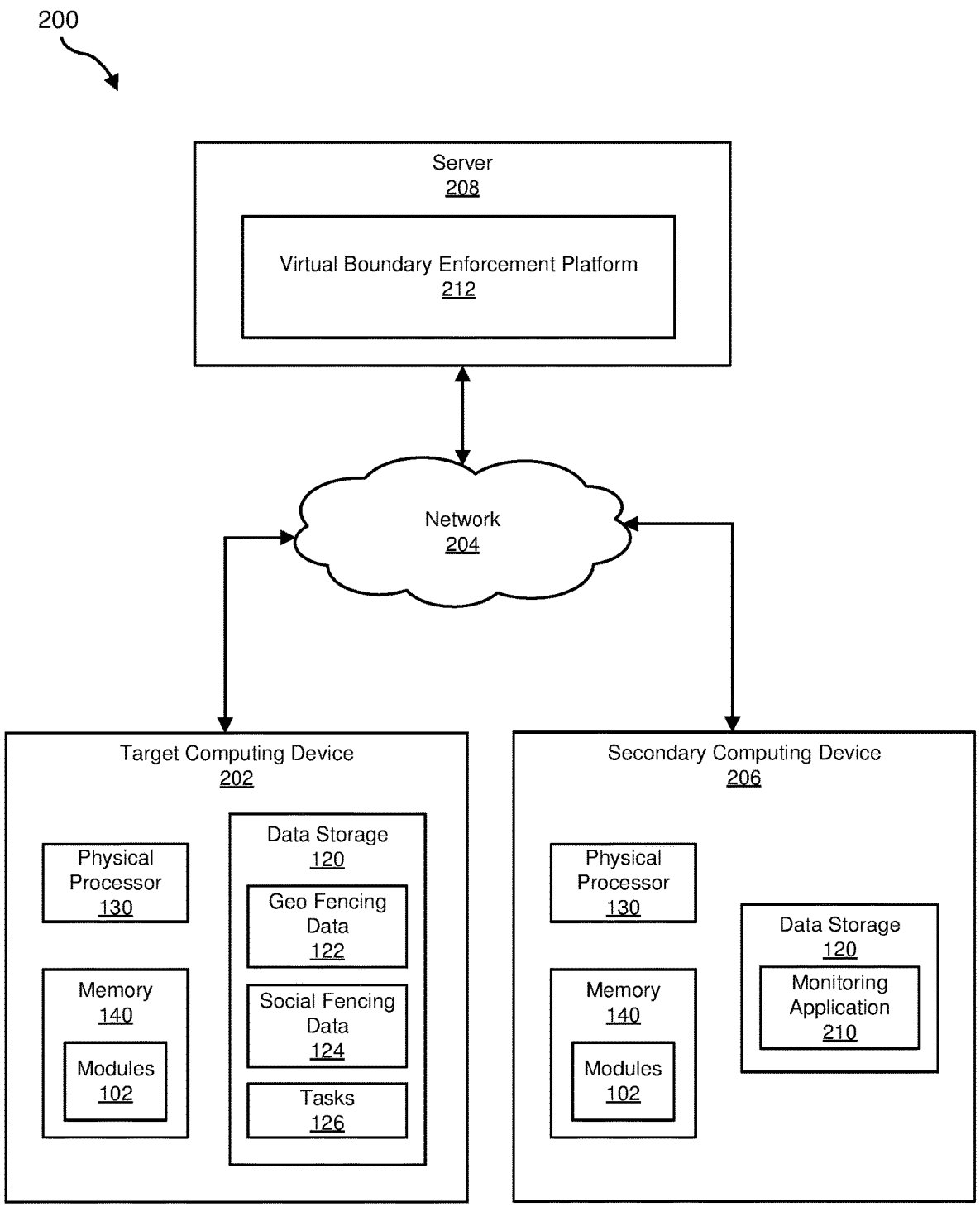
FIG. 2 is a block diagram of an additional example system for virtual boundary enforcement using network filters.

The following will provide, with reference to FIGS. 1-2, detailed descriptions of example systems for virtual boundary enforcement using network filters. Detailed descriptions of corresponding computer-implemented methods will also be provided in connection with FIGS. 3-4. A detailed description of data flow through the example system for virtual boundary enforcement using network filters will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for virtual boundary enforcement using network filters. As illustrated in this figure, the example system 100 may include one or more modules 102 for performing one or more tasks. As will be explained in greater detail below, the modules 102 may include a receiving module 104, a network filter module 106, a virtual boundary module 108, and a security module 110. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., a target computing device 202, a secondary computing device 206, and/or a server 208). One or more of the modules 102 in FIG. 1 may also represent all or portions of one or more special-purpose computers configured to perform one or more tasks.

As illustrated in FIG. 1, the example system 100 may also include one or more memory devices, such as memory 140. The memory 140 generally represents any type or form of volatile or non-volatile storage device or medium capable of storing data and/or computer-readable instructions. In one example, the memory 140 may store, load, and/or maintain one or more of modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, the example system 100 may also include one or more physical processors, such as physical processor 130. The physical processor 130 generally represents any type or form of hardware-implemented processing unit capable of interpreting and/or executing computer-readable instructions. In one example, the physical processor 130 may access and/or modify one or more of the modules 102 stored in the memory 140. Additionally, or alternatively, the physical processor 130 may execute one or more of the modules 102 to facilitate virtual boundary enforcement using network filters. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, the example system 100 may also include data storage 120. The data storage 120 generally represents any type or form of computing device capable of data storage. In one example, the data storage 120 may store geofencing data 122, social fencing data 124, and/or tasks 126.

The example system 100 in FIG. 1 may be implemented in a variety of ways. For example, all or a portion of the example system 100 may represent portions of example system 200 in FIG. 2. As shown in FIG. 2, the system 200 may include a target computing device 202 in communication with a secondary computing device 206 and/or a server 208 via a network 204. In one example, all or a portion of the functionality of the modules 102 may be performed by the target computing device 202, the secondary computing device 206, the server 208, and/or any other suitable computing system. As will be described in greater detail below, one or more of the modules 102 from FIG. 1 may, when executed by at least one processor of the target computing device 202, the secondary computing device 206, and/or the server 208, enable the target computing device 202, the secondary computing device 206, and/or the server 208 to enforce virtual boundaries using network filters. For example, and as will be described in greater detail below, one or more of the modules 102 may cause the target computing device 202, the secondary computing device 206, and/or the server 208 to apply a network filter to network traffic associated with the target computing device 202, analyze the data generated by the network filter, identify a potential violation of a virtual boundary associated with the target computing device 202, and perform a security action in response to identifying the potential violation.

The target computing device 202 generally represents any type or form of computing device capable of reading computer-executable instructions. For example, the target computing device 202 may include an endpoint device (e.g., a mobile computing device) running client-side security software capable of establishing one or more virtual boundaries, such as those used in connection with geofencing and/or social fencing. The virtual boundaries for the target computing device 202 may be established based on the geofencing data 122 and/or the social fencing data 124 of the target computing device 202. Additional examples of the target computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The secondary computing device 206 generally represents any type or form of computing device capable of reading computer-executable instructions. For example, the secondary computing device 206 may include an endpoint device (e.g., a mobile computing device) running client-side security software to monitor the target computing device 202, such as monitoring application 210. The monitoring application 210 may receive alerts through the virtual boundary enforcement platform 212 if the target computing device 202 has potentially violated an established virtual boundary. The violation of the established virtual boundary may be determined based on the geofencing data 122 and/or the social fencing data 124 of the target computing device 202. In some examples, the monitoring application 210 may be used to modify, through the virtual boundary enforcement platform 212, the data for the virtual boundary, such as the geofencing data 122 and/or the social fencing data 124. Additional examples of the secondary computing device 206 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The server 208 generally represents any type or form of computing device that is capable of reading computer-executable instructions. In one example, the server 208 may represent a server capable of hosting a virtual boundary enforcement platform 212 to facilitate enforcement of virtual boundaries, such as geofences or social fences, for the target computing device 202 and notifying the secondary computing device 206 of any virtual boundary violations. The virtual boundary enforcement platform 212 may be used to manage data associated with the virtual boundary and facilitate communications between computing devices, such as the target computing device 202 and the secondary computing device 206. For example, the virtual boundary enforcement platform 212 may be used to set the parameters of a geofence or manage whitelists (e.g., approved people/user devices) or blacklists (e.g., disapproved people and/or user devices) for a social fence. The virtual boundary enforcement platform 212 may be used manage the whitelists or blacklists using social network platforms associated with a user of the target computing device 202 or adding information about people (e.g., name, associated user device, photograph, audio clip, etc.) on a whitelist or blacklist of the social fence. Additional examples of the server 208 include, without limitation, security servers, application servers, web servers, storage servers, and/or database servers configured to run certain software applications and/or provide various security, web, storage, and/or database services. Although illustrated as a single entity in FIG. 2, the server 208 may include and/or represent a plurality of servers that work and/or operate in conjunction with one another.

The network 204 generally represents any medium or architecture capable of facilitating communication or data transfer. In one example, the network 204 may facilitate communication between the target computing device 202, the secondary computing device 206, and/or the server 208. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
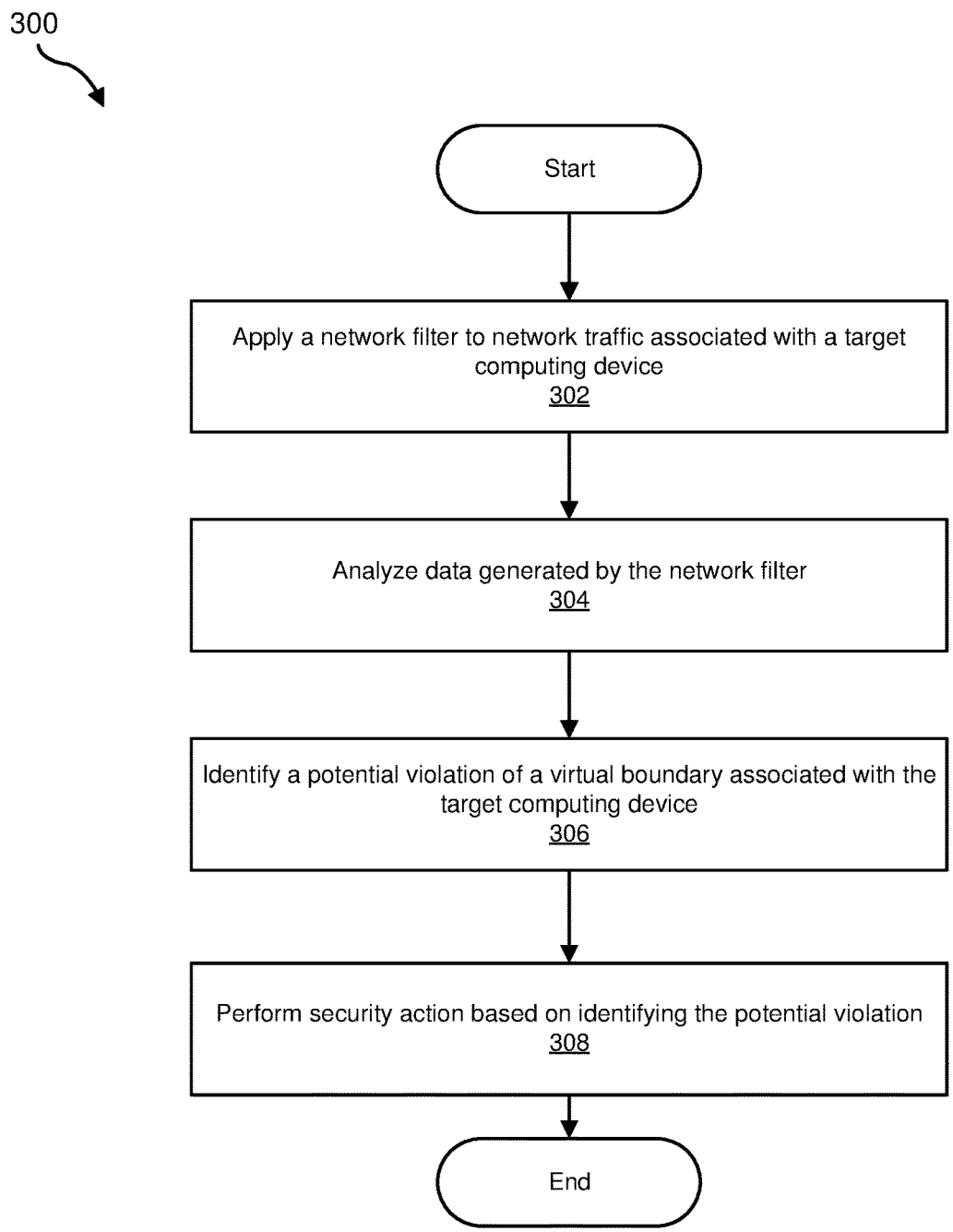
FIG. 3 is a flow diagram of an example method for virtual boundary enforcement using network filters.

FIG. 3 is a flow diagram of an example computer-implemented method 300 for virtual boundary enforcement using network filters. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may apply a network filter to network traffic associated with a computing device, such as the target computing device 202. The system may apply the network filter to the network traffic associated with the target computing device 202 in any suitable manner. For example, the receiving module 104 may, as part of target computing device 202 in FIG. 2, receive network traffic, such as data transmitted or received by the target computing device 202 over the network 204 to or from one or more computing devices, such as user devices or servers. The network filter module 106 may apply one or more network filters to the network traffic received by the receiving module 104.

The term "network filter," as used herein, generally refers to a software component that may monitor and control incoming and outgoing network traffic based on predetermined security rules. In some examples, network filters may include instructions that may be executed whenever network traffic passes through the network filter. For example, a network filter may execute instructions to obtain current global positioning system (GPS) coordinates for the computing device on which it is executing. In some examples, the network filter may instruct a microphone and/or camera to capture content upon detecting network traffic passing through the network filter. The network filter may be a software extension that may be implemented as a software driver, a virtual private network gateway, or the like.

At step 304, one or more of the systems described herein may analyze data generated by the network filter. The system may analyze the data generated by the network filter in any suitable manner. For example, the network filter module 106 may use a network filter to obtain and/or generate the data at regular intervals while the network traffic is passing through the network filter.

In some examples, the network filter module 106 may, in response to detecting network traffic by the network filter, instruct the network filter to obtain a location of the target computing device 202. The network filter may obtain location information of the target computing device 202 from a GPS receiver of the target computing device 202. In some examples, the network filter may perform operations to determine a relative position of the target computing device 202 to a known network gateway using the wireless network signal strength or the cellular network signal strength of the target computing device 202 and triangulation calculations. In some examples, the network filter may detect location information for the target computing device 202 in the network traffic and may intercept or copy the location information from the network traffic to analyze.

In some examples, the network filter module 106 may, in response to detecting network traffic with the network filter, obtain audio or visual content using components of the target computing device 202. For example, upon detecting network traffic passing through the network filter, the network filter may cause a microphone or a camera of the computing device to capture content clips (e.g., audio clips, video clips, photographs, etc.). In some examples, the network filter may detect content captured by the target computing device 202 and may obtain a copy of the detected content to analyze.

In some examples, the network filter module 106 may direct the network filter to obtain data from other nearby user devices that may include user device identification data. For example, the target computing device 202 may establish direct communication channels with other nearby devices and may obtain a user device identifier or other information, such as user account information for an application, such as social networking applications, messaging applications, or the like.

The network filter module 106 may analyze the generated and/or obtained data. For example, the network filter may compare the location data obtained or generated by the network filter to geofencing data 122 that establishes a geofence.

The term "geofence," as used herein, generally refers to a virtual perimeter around a physical location. A geofence may be dynamically generated or based on a predefined set of boundaries. Geofencing data 122 may be used to establish a variety of specific boundaries, such as the radius of a perimeter, specific predefined boundary locations around a physical location, etc.

In another example, the network filter may analyze the content obtained or generated by the network filter (e.g., audio clip, video clip, photographs, etc.) and compare the data to a social fence. In some examples, voice recognition techniques may be applied to the audio or video clip to identify people based on their voices. Facial recognition or object recognition techniques may be applied to the video clip or photograph to identify people and/or user devices. In some examples, the network filter may obtain device identification information or user account information from nearby computing devices. Identified people and/or user devices may be compared to social fencing data 124 that establishes a social fence.

The term "social fence," as used herein, generally refers to a virtual boundary to identify people and/or user devices within a predetermined distance from the target computing device 202. A social fence may include one or more rules that establish a virtual boundary permitting people and/or user devices within a predetermined radius from the target computing device 202. The social fence may include a list of people and/or user devices that are permitted within the virtual boundary or may include a list of people and/or user devices that are not permitted within the virtual boundary.

At step 306, one or more of the systems described herein may identify a potential violation of a virtual boundary associated with the target computing device 202. The system may identify the potential violation of the virtual boundary in any suitable manner. In some examples, the virtual boundary module 108 of the target computing device 202 may use the analyzed data to identify a potential violation of the virtual boundary associated with the target computing device 202.

For example, if the virtual boundary is a geofence, the virtual boundary module 108 may obtain geofencing data 122 stored locally on the target computing device 202 or from the virtual boundary enforcement platform 212. The virtual boundary module 108 may then compare the analyzed data to data that indicates the boundaries of the geofence to determine whether the geofence has been violated. In one example, a parent may set a primary geofence associated with the boundaries of an apartment in a building. The purpose of the primary geofence may be to trigger a security action if the target computing device 202 exits the boundaries of the geofence. The geofencing data 122 may also include data for a secondary geofence, which may be slightly smaller than the primary geofence and serve as a warning boundary. If the target computing device 202 is determined to have crossed the secondary geofence but not the primary geofence, a warning may be displayed on the target computing device 202 indicating that they are close to violating the primary geofence. The virtual boundary module 108 may continuously generate and/or obtain location data of the target computing device 202 and compare the location data to the geofence to determine whether a potential violation of the geofence has occurred.

Similarly, the parent may set a primary geofence to be a specific location, such as an arcade. The purpose of the primary geofence may be to trigger a security action if the target computing device 202 enters the boundaries of the primary geofence. The geofencing data 122 may also include data for a secondary geofence, which may be slightly larger than the primary geofence and serve as a warning boundary. If the target computing device 202 is determined to have crossed the secondary geofence but not the primary geofence, a warning may be displayed on the target computing device 202 that they are close to violating the primary geofence.

In one example, if the virtual boundary is a social fence, the virtual boundary module 108 may obtain social fencing data 124 stored locally on the target computing device 202 or from the virtual boundary enforcement platform 212. The virtual boundary module 108 may compare the analyzed data to data for the social fence to determine whether the social fence has been violated. In one example, the virtual boundary module 108 may determine that the social fencing data 124 includes a timing boundary (e.g., 30-minute threshold) and/or a spatial boundary (e.g., 20 feet). The timing boundary may be period of time allotted before a security action is triggered. The spatial boundary may be a distance from the target computing device 202 that may trigger a security action if violated. The virtual boundary module 108 may use the analyzed data to determine whether the social fence has been violated. For example, the virtual boundary module 108 may receive the data analyzed by the network filter module 106. In some examples, this data may identify (or be used to identify) specific people and/or user devices. The virtual boundary module 108 may use the social fencing data 124 to determine whether the social fence has been violated. The social fencing data 124 may include a whitelist (e.g., list of approved people and/or user devices). The virtual boundary module 108 may compare the identified people and/or user devices to the whitelist. If the identified people and/or user devices are on the whitelist, no further action may be taken. If the identified people and/or user devices are not on the whitelist, the virtual boundary module 108 may determine that the social fence has been violated.

In another example, the virtual boundary module 108 may use the social fencing data 124 to determine whether the social fence has been violated. The social fencing data 124 may include a blacklist (e.g., list of disapproved people and/or user devices). The virtual boundary module 108 may compare the identified people and/or user devices to the blacklist. If the identified people and/or user devices are not on the blacklist, no further action may be taken. If the identified people and/or user devices are on the blacklist, the virtual boundary module 108 may determine that the social fence has been violated.

At step 308, one or more of the systems described herein may perform a security action based on identifying the potential violation of the virtual boundary associated with the target computing device 202. The system may perform the security action in any suitable manner. In some examples, the security module 110 may receive, from the virtual boundary module 108, an indication that the virtual boundary has been violated. In response to receiving the indication that the virtual boundary has been violated, the security module 110 may perform one or more security actions.

In one example, the security action may include presenting a notification to a user of the secondary computing device 206 (e.g., computing device operated by an individual monitoring the target computing device 202, such as a parent). The notification may be received by the monitoring application 210 of the secondary computing device 206. The notification may indicate that the virtual boundary has been violated. In some examples, additional details about the violation of the virtual boundary may be included in the notification, such as time of the violation, number of violations, and the like. If the virtual boundary is the geofence, the notification may include a current location of the target computing device 202. If the virtual boundary is the social fence, the notification may include information about the identified person and/or user device and the content clip used to identify the person and/or user device used to determine the violation of the social fence.

In some examples, the user of the target computing device 202 may wish to obtain a temporary exemption or exception from the virtual boundary. For example, if a child needs to work on a school project at the home of a classmate, they would need to violate the established geofence. In another example, if the classmate is on the blacklist of the social fence, the child may need to violate the established social fence to complete the school project. In some examples, the child may use the target computing device 202 to request a temporary exemption or exception from the virtual boundary. The virtual boundary enforcement platform 212 may receive the request and transmit a notification to the secondary computing device 206, operated by the parent. The parent may, in response to the notification and using the monitoring application 210, transmit an approval of the temporary exemption. The parent may specify a time period (e.g., 2-hour exemption for an unidentified classmate or a classmate on the blacklist) or location (e.g., permission to work at the home of the classmate) for the exemption to the virtual boundary. In some examples, the virtual boundary enforcement platform 212 may notify the target computing device 202 of the temporary exemption with any parameters specified by the parent. In some examples, the virtual boundary enforcement platform 212 may generate a temporary code associated with the approval of the exemption and associated parameters. The code may be transmitted to the secondary computing device 206. The user of the secondary computing device 206 may relay the temporary code to the target computing device 202 (e.g., text message, voice call, etc.). The user of the target computing device 202 may need to enter the temporary code to permit the exemption from the virtual boundary.

In some examples, the user of the target computing device 202 may wish to add an unidentified person or user device to the social fence. The target computing device 202 may transmit a notification including information about the person or user device (e.g., name, age, home address, contact number, picture, audio clip of voice, etc.) to the secondary computing device 206, such as through the virtual boundary enforcement platform 212. The user of the secondary computing device 206 may receive the notification and may review the information included in the notification. The user of the secondary computing device 206 may approve or deny the request. If the request is approved, the identified person or user device may be added to the whitelist. The virtual boundary enforcement platform may transmit a response to the target computing device 202 indicating approval or denial of the request.

Figure 4:
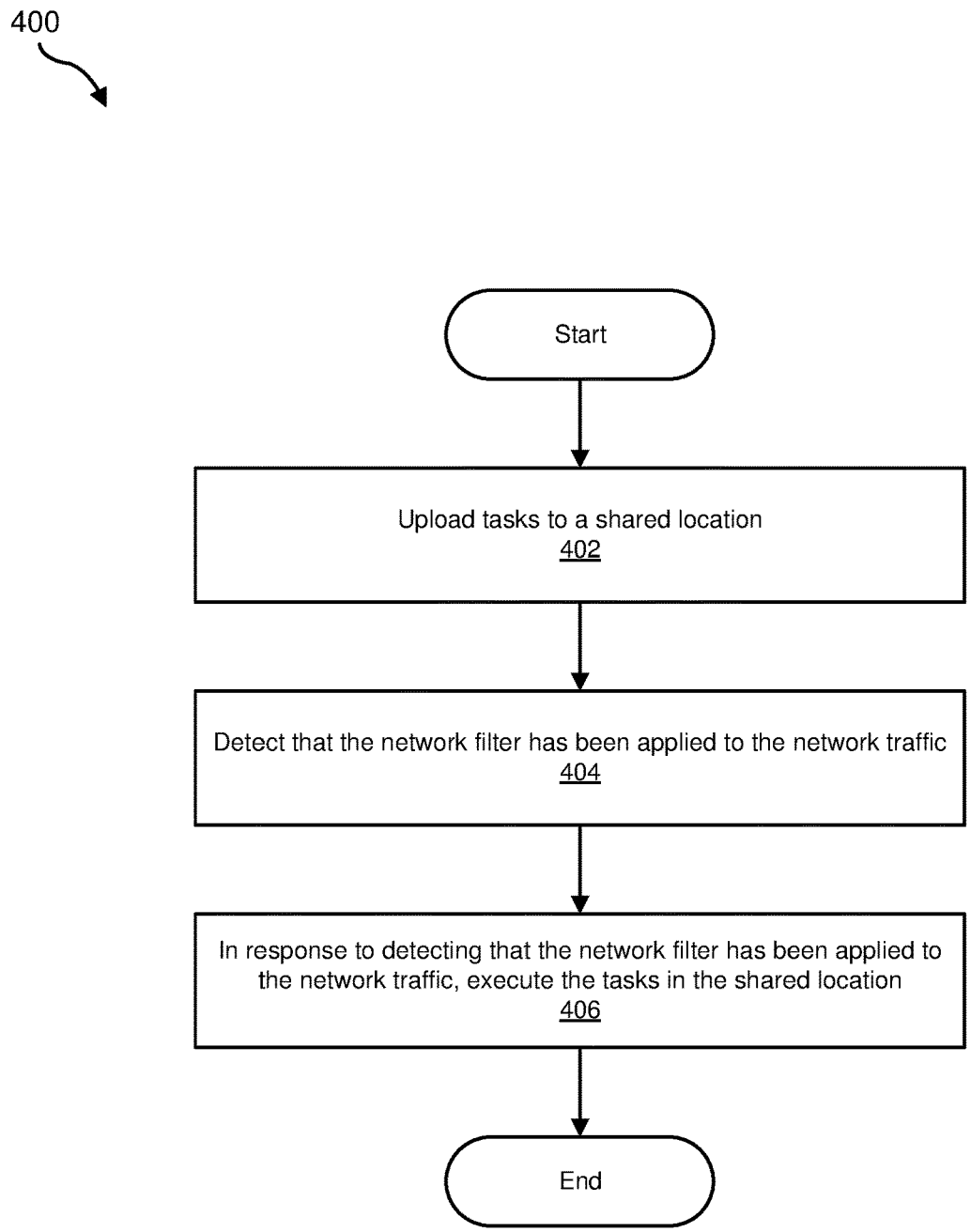
FIG. 4 is a flow diagram of an example method for executing tasks using network filters.
Figure 5:
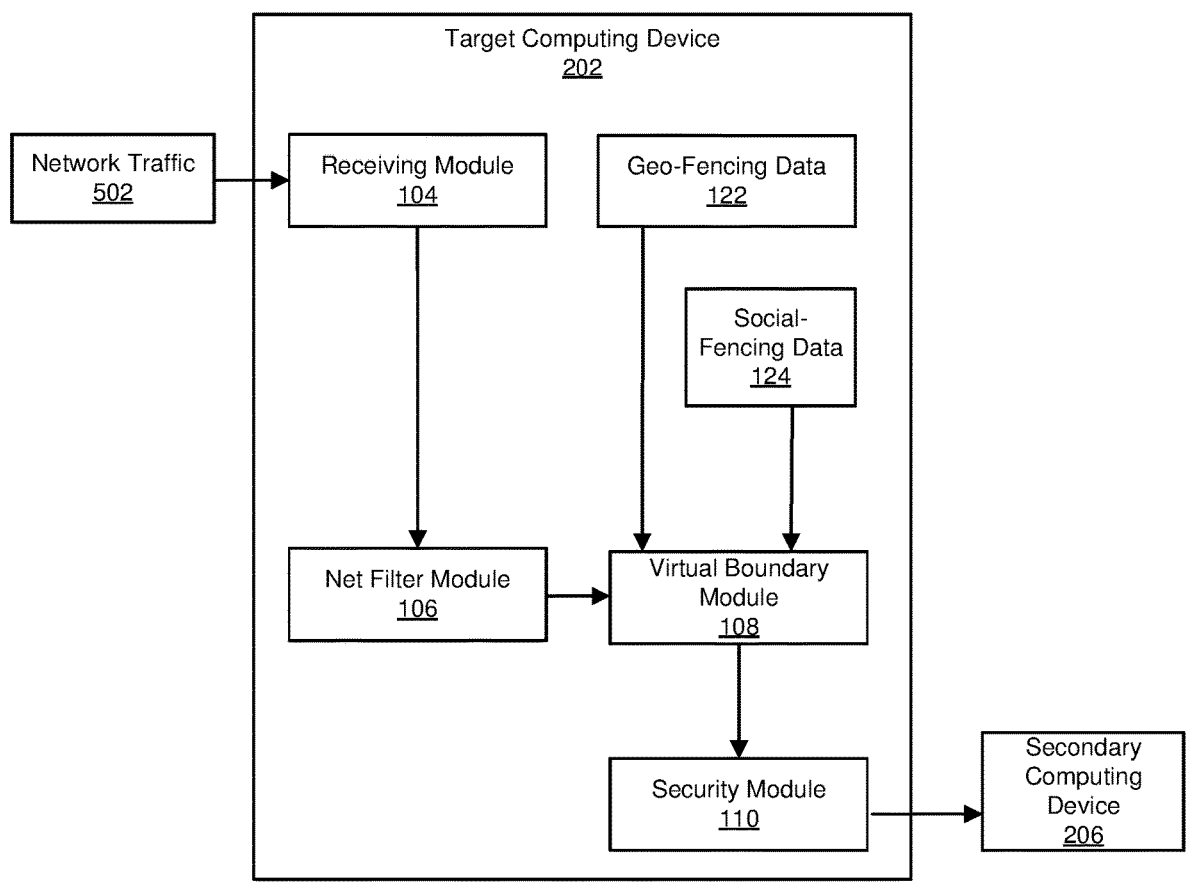
FIG. 5 is a data flow diagram of an example system for virtual boundary enforcement using network filters.

FIG. 4 is a flow diagram of an example computer-implemented method 400 for using network filters to execute scheduled tasks. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402, one or more of the systems described herein may upload tasks to a shared location. The system may upload tasks 126 to a shared location in any suitable manner. In some examples, the network filter module 106 of the target computing device 202 may upload tasks 126 to a shared location on the target computing device 202. The shared location may be a folder or other storage on the target computing device 202 accessible by one or more applications executing on the target computing device 202. For example, the network filter module 106, as it generates and/or obtains data, as described in FIG. 3, may upload tasks 126 associated with the data to the shared location for processing at a later time. In some examples, tasks 126 may be uploaded by different applications executing on the target computing device 202, which are not generated and/or obtained by the network filter module 106.

The term "task," as used herein, generally refers to a unit of execution or a unit of work to be completed by a computing device. Examples of tasks may include collecting and uploading browsing history logs to backend services, downloading policy updates, collecting and uploading location information of a computing device to backend services, collecting and uploading content (e.g., audio clips, video clips, photographs, etc.) of a computing device to backend services, aggregating collected data, or the like.

In some examples, the virtual boundary enforcement platform 212 may use data uploaded to the backend services through the executed tasks 126 to generate weekly reports associated with the virtual boundary. In some examples, the weekly reports may include the aggregated location data of the target computing device 202 for the week, aggregated lists of unidentified people and/or user devices for the social fence, or the like. The virtual boundary enforcement platform 212 may present the reports to the secondary computing device 206. The secondary computing device 206 may use the data in the weekly reports to manage the virtual boundary (e.g., expand geofence, add or remove people from whitelist or blacklist of the social fence, etc.).

At step 404, one or more of the systems described herein may detect that the network filter has been applied to the network traffic. The system may detect that the network filter has been applied in any suitable manner. In some examples, the network filter module 106 of the target computing device 202 may detect that the network filter is being applied to network traffic received by the target computing device 202. The network filter module 106 may determine that the network filter is being applied by determining whether a specific action associated with the network filter has been executed, such as monitoring the network traffic or executing a set of instructions.

At step 406, one or more of the systems described herein, in response to detecting that the network filter has been applied to the network traffic, may execute the tasks, such as tasks 126, in the shared location. The system may execute the tasks in the shared location in any suitable manner. In some examples, the network filter module 106 may, in response to detecting that the network filter has been applied to the network traffic of the target computing device 202, initiate a separate thread, which may load up one or more tasks 126 from the shared location and execute the tasks 126. In some examples, the network filter module 106 may upload and execute tasks based on policies associated with the target computing device 202. For example, a policy may state that tasks 126 may be executed over wireless networks and may not be executed over a cellular network. A policy may indicate that tasks 126 may only be executed during a predetermined period of time (e.g., mornings, afternoons, etc.) or if the target computing device 202 is connected to a power source.

The example system 100 in FIG. 1 may be implemented in a variety of ways. For example, all or a portion of the example system 100 may represent portions of the system 500 in FIG. 5. As will be described in greater detail below, one or more of the modules 102 from FIG. 1 may, when executed by at least one processor of target computing device 202, enable the system 500 to enforce virtual boundaries using network filters. For example, and as will be described in greater detail below, one or more of the modules 102 may cause the example system 500 to receive, by the receiving module 104, network traffic 502 associated with the target computing device 202. The network filter module 106 may apply a network filter to the received network traffic 502. The virtual boundary module 108 may analyze data generated by the applied network filter and may identify, based on an analysis of the data, a potential violation of a virtual boundary associated with the target computing device 202. The virtual boundary module 108 may use geofencing data 122 and/or social fencing data 124 to identify the potential violation of the virtual boundary. The security module 110 may, in response to identifying the potential violation, perform a security action to enforce the virtual boundary associated with the target computing device 202, such as by notifying the secondary computing device 206 of the potential violation of the virtual boundary.

The systems and methods described herein are generally directed to enforcing virtual boundaries using network filters. Existing solutions typically prevent applications from executing in the background of a computing device unless the application is marked as a navigation application or an application for streaming content. Enforcement of virtual boundaries, such as geofencing or social fencing, for a computing device may involve continuous monitoring of actions of the computing device. The systems and methods described herein are directed to using network filters to continuously monitor and enforce virtual boundaries. Network filters may be applied to network traffic of the computing device. As network filters are applied to the network traffic, custom logic may be executed upon the network traffic. For example, for geofencing, a network filter may track the current location of the computing device at regular intervals and calculate distances to ensure the computing device is within the boundaries of the geofence. Using the network filter to obtain the position of the computing device from data of the network traffic may enable that the geofence is enforced at a higher precision than existing solutions.

Similarly, for social fencing, a network filter may utilize a microphone and/or camera of the computing device to obtain audio and/or video clips at regular intervals and analyzing the content to identify people or devices near the computing device. People and/or devices identified may be compared to a list of permitted people and/or devices and the social fence may be continuously enforced to ensure that unapproved people and/or devices are not within a predetermined distance of the computing device for an extended period of time.

If the systems and methods described herein identify a potential violation of a virtual boundary, a security action may be performed as part of the enforcement of the virtual boundary. For example, a warning message may be transmitted to a different computing device with an alert including information about the potential violation of the virtual boundary.

Figure 6:
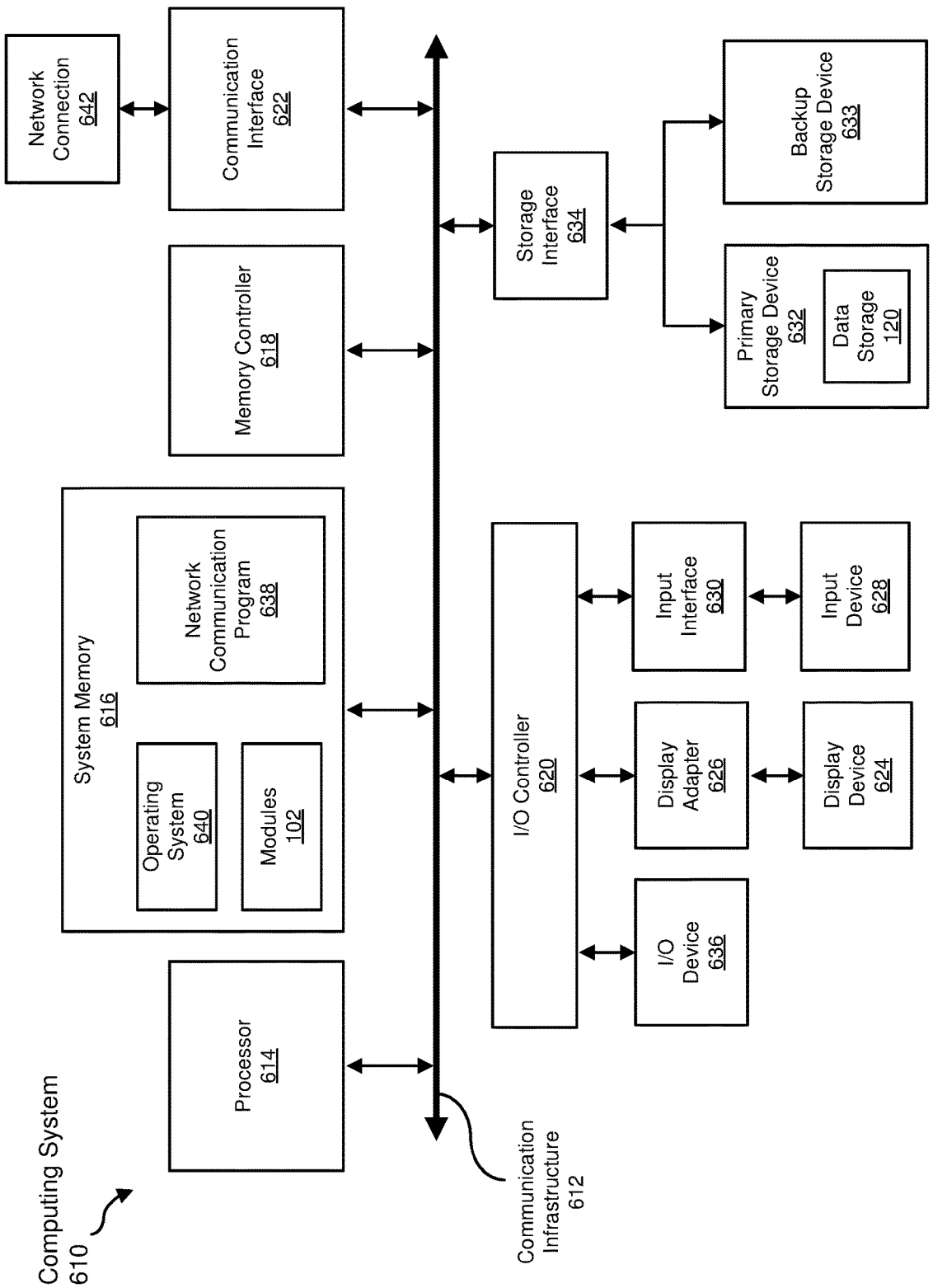
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of the computing system 610 may perform and/or be a means for performing, either alone or in combination with other elements, one or more of the steps described herein (such as one or more of the steps illustrated in FIGS. 3-4). All or a portion of the computing system 610 may also perform and/or be a means for performing any other steps, methods, or processes described and/or illustrated herein.

The computing system 610 broadly represents any single or multi-processor computing device or system capable of executing computer-readable instructions. Examples of the computing system 610 include, without limitation, workstations, laptops, client-side terminals, servers, distributed computing systems, handheld devices, or any other computing system or device. In its most basic configuration, the computing system 610 may include at least one processor 614 and a system memory 616.

The processor 614 generally represents any type or form of physical processing unit (e.g., a hardware-implemented central processing unit) capable of processing data or interpreting and executing instructions. In certain embodiments, the processor 614 may receive instructions from a software application or module. These instructions may cause the processor 614 to perform the functions of one or more of the example embodiments described and/or illustrated herein.

The system memory 616 generally represents any type or form of volatile or non-volatile storage device or medium capable of storing data and/or other computer-readable instructions. Examples of the system memory 616 include, without limitation, Random Access Memory (RAM), Read Only Memory (ROM), flash memory, or any other suitable memory device. Although not required, in certain embodiments, the computing system 610 may include both a volatile memory unit (such as, for example, system memory 616) and a non-volatile storage device (such as, for example, primary storage device 632, as described in detail below). In one example, one or more of the modules 102 from FIG. 1 may be loaded into the system memory 616.

In some examples, the system memory 616 may store and/or load an operating system 640 for execution by the processor 614. In one example, the operating system 640 may include and/or represent software that manages computer hardware and software resources and/or provides common services to computer programs and/or applications on the computing system 610. Examples of the operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 610 may also include one or more components or elements in addition to the processor 614 and the system memory 616. For example, as illustrated in FIG. 6, the computing system 610 may include a memory controller 618, an Input/Output (I/O) controller 620, and a communication interface 622, each of which may be interconnected via a communication infrastructure 612. The communication infrastructure 612 generally represents any type or form of infrastructure capable of facilitating communication between one or more components of a computing device. Examples of the communication infrastructure 612 include, without limitation, a communication bus (such as an Industry Standard Architecture (ISA), Peripheral Component Interconnect (PCI), PCI Express (PCIe), or similar bus) and a network.

The memory controller 618 generally represents any type or form of device capable of handling memory or data or controlling communication between one or more components of the computing system 610. For example, in certain embodiments, the memory controller 618 may control communication between the processor 614, the system memory 616, and the I/O controller 620 via the communication infrastructure 612.

The I/O controller 620 generally represents any type or form of module capable of coordinating and/or controlling the input and output functions of a computing device. For example, in certain embodiments, the I/O controller 620 may control or facilitate transfer of data between one or more elements of the computing system 610, such as the processor 614, the system memory 616, the communication interface 622, the display adapter 626, the input interface 630, and the storage interface 634.

As illustrated in FIG. 6, the computing system 610 may also include at least one display device 624 coupled to the I/O controller 620 via a display adapter 626. The display device 624 generally represents any type or form of device capable of visually displaying information forwarded by the display adapter 626. Similarly, the display adapter 626 generally represents any type or form of device configured to forward graphics, text, and other data from the communication infrastructure 612 (or from a frame buffer, as known in the art) for display on the display device 624.

As illustrated in FIG. 6, the example computing system 610 may also include at least one input device 628 coupled to the I/O controller 620 via an input interface 630. The input device 628 generally represents any type or form of input device capable of providing input, either computer or human generated, to example computing system 610. Examples of the input device 628 include, without limitation, a keyboard, a pointing device, a speech recognition device, variations or combinations of one or more of the same, and/or any other input device.

Additionally or alternatively, the example computing system 610 may include additional I/O devices. For example, the example computing system 610 may include the I/O device 636. In this example, the I/O device 636 may include and/or represent a user interface that facilitates human interaction with the computing system 610. Examples of the I/O device 636 include, without limitation, a computer mouse, a keyboard, a monitor, a printer, a modem, a camera, a scanner, a microphone, a touchscreen device, variations or combinations of one or more of the same, and/or any other I/O device.

The communication interface 622 broadly represents any type or form of communication device or adapter capable of facilitating communication between the example computing system 610 and one or more additional devices. For example, in certain embodiments, the communication interface 622 may facilitate communication between the computing system 610 and a private or public network including additional computing systems. Examples of the communication interface 622 include, without limitation, a wired network interface (such as a network interface card), a wireless network interface (such as a wireless network interface card), a modem, and any other suitable interface. In at least one embodiment, the communication interface 622 may provide a direct connection to a remote server via a direct link to a network, such as the Internet. The communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 622 may also represent a host adapter configured to facilitate communication between the computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like.

The communication interface 622 may also allow the computing system 610 to engage in distributed or remote computing. For example, the communication interface 622 may receive instructions from a remote device or send instructions to a remote device for execution.

In some examples, the system memory 616 may store and/or load a network communication program 638 for execution by the processor 614. In one example, the network communication program 638 may include and/or represent software that enables the computing system 610 to establish a network connection 642 with another computing system (not illustrated in FIG. 6) and/or communicate with the other computing system by way of the communication interface 622. In this example, the network communication program 638 may direct the flow of outgoing traffic that is sent to the other computing system via the network connection 642. Additionally, or alternatively, the network communication program 638 may direct the processing of incoming traffic that is received from the other computing system via the network connection 642 in connection with the processor 614.

Although not illustrated in this way in FIG. 6, the network communication program 638 may alternatively be stored and/or loaded in the communication interface 622. For example, the network communication program 638 may include and/or represent at least a portion of software and/or firmware that is executed by a processor and/or Application Specific Integrated Circuit (ASIC) incorporated in the communication interface 622.

As illustrated in FIG. 6, the example computing system 610 may also include a primary storage device 632 and a backup storage device 633 coupled to the communication infrastructure 612 via a storage interface 634. The storage devices 632 and 633 generally represent any type or form of storage device or medium capable of storing data and/or other computer-readable instructions. For example, the storage devices 632 and 633 may be a magnetic disk drive (e.g., a so-called hard drive), a solid state drive, a floppy disk drive, a magnetic tape drive, an optical disk drive, a flash drive, or the like. The storage interface 634 generally represents any type or form of interface or device for transferring data between the storage devices 632 and 633 and other components of the computing system 610. In one example, the data storage 120 from FIG. 1 may be stored and/or loaded in the primary storage device 632.

In certain embodiments, the storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 632 and 633 may also include other similar structures or devices for allowing computer software, data, or other computer-readable instructions to be loaded into the computing system 610. For example, the storage devices 632 and 633 may be configured to read and write software, data, or other computer-readable information. The storage devices 632 and 633 may also be a part of the computing system 610 or may be a separate device accessed through other interface systems.

Many other devices or subsystems may be connected to the computing system 610. Conversely, all of the components and devices illustrated in FIG. 6 need not be present to practice the embodiments described and/or illustrated herein. The devices and subsystems referenced above may also be interconnected in different ways from that shown in FIG. 6. The computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 610. All or a portion of the computer program stored on the computer-readable medium may then be stored in the system memory 616 and/or various portions of the storage devices 632 and 633. When executed by the processor 614, a computer program loaded into the computing system 610 may cause the processor 614 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 610 may be configured as an Application Specific Integrated Circuit (ASIC) adapted to implement one or more of the example embodiments disclosed herein.

Figure 7:
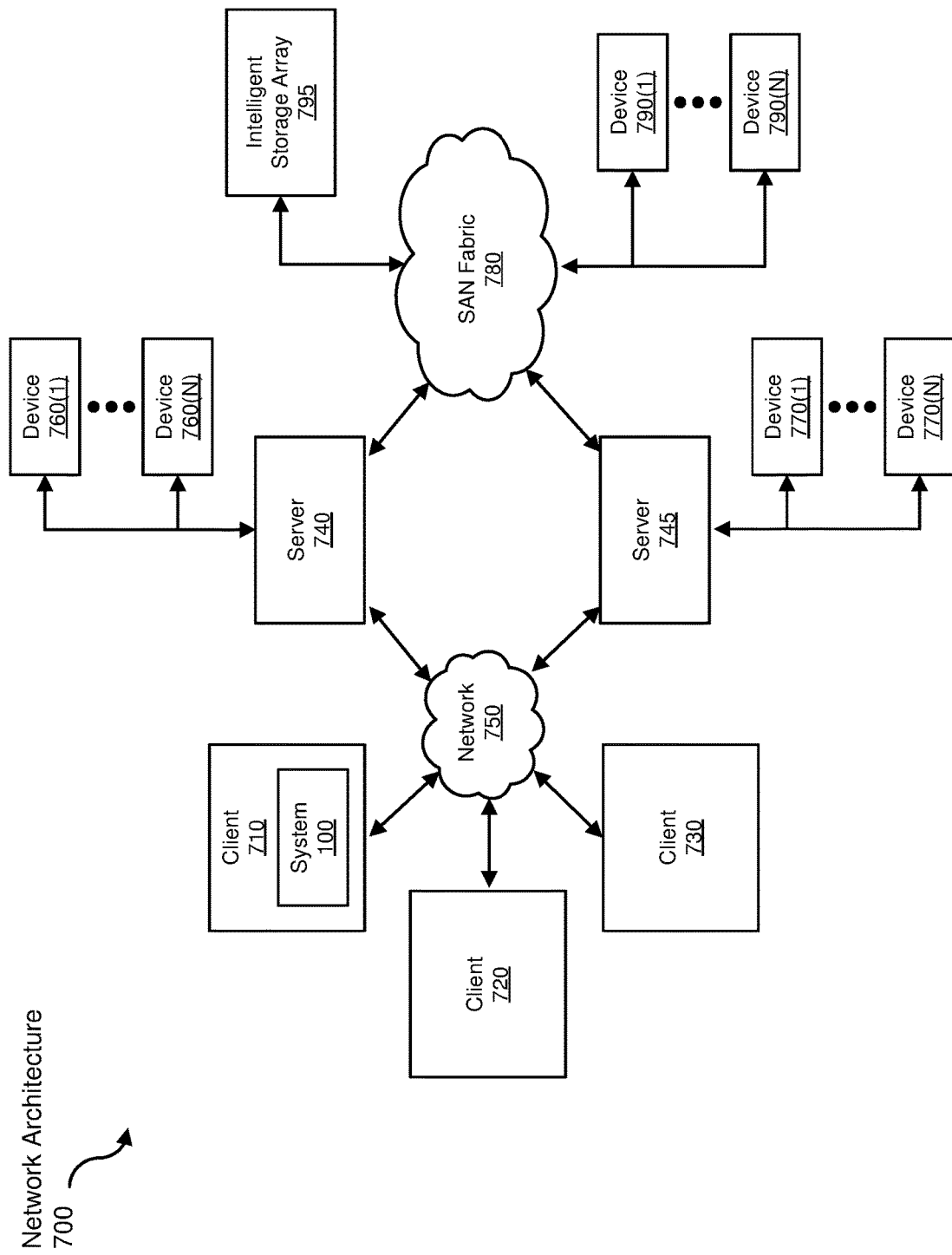
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of the network architecture 700 may perform and/or be a means for performing, either alone or in combination with other elements, one or more of the steps disclosed herein (such as one or more of the steps illustrated in FIG. 3). All or a portion of the network architecture 700 may also be used to perform and/or be a means for performing other steps and features set forth in the instant disclosure.

The client systems 710, 720, and 730 generally represent any type or form of computing device or system, such as example the computing system 610 in FIG. 6. Similarly, the servers 740 and 745 generally represent computing devices or systems, such as application servers or database servers, configured to provide various database services and/or run certain software applications. The network 750 generally represents any telecommunication or computer network including, for example, an intranet, a WAN, a LAN, a PAN, or the Internet. In one example, the client systems 710, 720, and/or 730 and/or the servers 740 and/or 745 may include all or a portion of the system 100 from FIG. 1.

As illustrated in FIG. 7, one or more storage devices 760(1)-(N) may be directly attached to the server 740. Similarly, the one or more storage devices 770(1)-(N) may be directly attached to the server 745. The storage devices 760(1)-(N) and the storage devices 770(1)-(N) generally represent any type or form of storage device or medium capable of storing data and/or other computer-readable instructions. In certain embodiments, the storage devices 760(1)-(N) and the storage devices 770(1)-(N) may represent Network-Attached Storage (NAS) devices configured to communicate with the servers 740 and 745 using various protocols, such as Network File System (NFS), Server Message Block (SMB), or Common Internet File System (CIFS).

The servers 740 and 745 may also be connected to a Storage Area Network (SAN) fabric 780. The SAN fabric 780 generally represents any type or form of computer network or architecture capable of facilitating communication between a plurality of storage devices. The SAN fabric 780 may facilitate communication between the servers 740 and 745 and a plurality of the storage devices 790(1)-(N) and/or an intelligent storage array 795. The SAN fabric 780 may also facilitate, via the network 750 and the servers 740 and 745, communication between the client systems 710, 720, and 730 and the storage devices 790(1)-(N) and/or the intelligent storage array 795 in such a manner that the devices 790(1)-(N) and they array 795 appear as locally attached devices to the client systems 710, 720, and 730. As with the storage devices 760(1)-(N) and the storage devices 770(1)-(N), the storage devices 790(1)-(N) and the intelligent storage array 795 generally represent any type or form of storage device or medium capable of storing data and/or other computer-readable instructions.

In certain embodiments, and with reference to the example computing system 610 of FIG. 6, a communication interface, such as communication interface 622 in FIG. 6, may be used to provide connectivity between each client system 710, 720, and 730 and the network 750. The client systems 710, 720, and 730 may be able to access information on the server 740 or 745 using, for example, a web browser or other client software. Such software may allow the client systems 710, 720, and 730 to access data hosted by the server 740, the server 745, the storage devices 760(1)-(N), the storage devices 770(1)-(N), the storage devices 790(1)-(N), or the intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by the server 740, the server 745, the storage devices 760(1)-(N), the storage devices 770(1)-(N), the storage devices 790(1)-(N), the intelligent storage array 795, or any combination thereof. All or a portion of one or more of the example embodiments disclosed herein may also be encoded as a computer program, stored in the server 740, run by the server 745, and distributed to the client systems 710, 720, and 730 over the network 750.

As detailed above, the computing system 610 and/or one or more components of the network architecture 700 may perform and/or be a means for performing, either alone or in combination with other elements, one or more steps of an example method for virtual boundary enforcement using network filters.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising".

What is claimed is:

1. A computer-implemented method for virtual boundary enforcement using network filters, at least a portion of the method being performed by a computing device comprising at least one processor, the method comprising:
    establishing a virtual boundary associated with a target computing device, wherein the virtual boundary comprises a social fence, associated with the target computing device, that identifies people permitted to be within a predetermined distance of the target computing device;
    applying a network filter to network traffic associated with the target computing device, wherein the network filter executes, in response to detecting incoming or outgoing network traffic of at least one application of the target computing device, instructions to capture audio data using a microphone of the target computing device, wherein the captured audio data comprises an audio clip;
    analyzing the captured audio data using a voice recognition technique;
    identifying, based on an analysis of the captured audio data obtained by the network filter, at least one task to be performed in connection with the virtual boundary;
    identifying by executing the task, a potential violation of the virtual boundary associated with the target computing device; and
    in response to identifying the potential violation, performing a security action to enforce the virtual boundary associated with the target computing device, wherein the security action comprises:
        determining, based on the analysis of the captured audio data, that an unidentified person is within the predetermined distance of the target computing device; and
        transmitting, to a different computing device, a notification that the target computing device has violated the social fence.

2. The computer-implemented method of claim 1, wherein:
    the virtual boundary comprises a geofence associated with the target computing device; and the network filter further executes instructions to capture positional data corresponding to at least one of global positioning system (GPS) data associated with the target computing device, data indicative of a wireless signal strength of the target computing device, or data indicative of a cellular signal strength of the target computing device.

3. The computer-implemented method of claim 2, wherein the security action comprises:
determining, based on the analysis of the captured positional data, that the target computing device has exited an established geofence; and
presenting, to a user of a different computing device, a notification that the target computing device has exited the established geofence.

4. The computer-implemented method of claim 1, further comprising:
transmitting a request to add the unidentified person to the social fence, wherein the request is accompanied by the audio clip; and
in response to receiving an approval of the request from the different computing device, adding the unidentified person to the social fence.

5. The computer-implemented method of claim 1, further comprising:
storing the task in a shared location for execution at a later point in time.

6. The computer-implemented method of claim 5, further comprising:
executing, at the later point in time via a background process running on the target computing device, the task from the shared location.

7. A system for virtual boundary enforcement using network filters, the system comprising:
at least one physical processor;
physical memory comprising computer-executable instructions that, when executed by the physical processor, cause the physical processor to:
establish a virtual boundary associated with a target computing device, wherein the virtual boundary comprises a social fence, associated with the target computing device, that identifies people permitted to be within a predetermined distance of the target computing device;
apply a network filter to network traffic associated with the target computing device, wherein the network filter executes, in response to detecting incoming or outgoing network traffic of at least one application of the target computing device, instructions to capture audio data using a microphone of the target computing device, wherein the captured audio data comprises an audio clip;
analyze the captured audio data using a voice recognition technique;
identify, based on an analysis of the captured audio data obtained by the network filter, at least one task to be performed in connection with the virtual boundary;
identify, by executing the task, a potential violation of the virtual boundary associated with the target computing device; and
in response to identifying the potential violation, perform a security action to enforce the virtual boundary associated with the target computing device, wherein the security action comprises:
determining, based on the analysis of the captured audio data, that an unidentified person is within the predetermined distance of the target computing device; and
transmitting, to a different computing device, a notification that the target computing device has violated the social fence.

8. The system of claim 7, wherein:
the virtual boundary comprises a geofence associated with the target computing device; and
the network filter further executes instructions to capture positional data corresponding to at least one of global positioning system (GPS) data associated with the target computing device, data indicative of a wireless signal strength of the target computing device, or data indicative of a cellular signal strength of the target computing device.

9. The system of claim 8, wherein the security action comprises:
determining, based on the analysis of the captured positional data, that the target computing device has exited an established geofence; and
presenting, to a user of a different computing device, a notification that the target computing device has exited the established geofence.

10. The system of claim 7, wherein the computer-executable instructions further cause the physical processor to:
transmit a request to add the unidentified person to the social fence, wherein the request is accompanied by the audio clip; and
in response to receiving an approval of the request from the different computing device, add the unidentified person to the social fence.

11. The system of claim 7, wherein the computer-executable instructions further cause the physical processor to:
store the task in a shared location for execution at a later point in time.

12. The system of claim 11, wherein the computer-executable instructions further cause the physical processor to:
execute, at the later point in time via a background process running on the target computing device, the task from the shared location.

13. A non-transitory computer-readable medium comprising one or more computer-executable instructions that, when executed by at least one processor of a computing device, cause the computing device to:
establish a virtual boundary associated with a target computing device, wherein the virtual boundary comprises a social fence, associated with the target computing device, that identifies people permitted to be within a predetermined distance of the target computing device;
apply a network filter to network traffic associated with a target computing device, wherein the network filter executes, in response to detecting incoming or outgoing network traffic of at least one application of the target computing device, instructions to capture audio data using a microphone of the target computing device, wherein the captured audio data comprises an audio clip;
analyze the captured audio data using a voice recognition technique;
identify, based on an analysis of the captured audio data obtained by the network filter, at least one task to be performed in connection with the virtual boundary;
identify, by executing the task, a potential violation of the virtual boundary associated with the target computing device; and in response to identifying the potential violation, perform a security action to enforce the virtual boundary associated with the target computing device, wherein the security action comprises:
    determining, based on the analysis of the captured audio data, that an unidentified person is within the predetermined distance of the target computing device; and
    transmitting, to a different computing device, a notification that the target computing device has violated the social fence.

14. The non-transitory computer-readable medium of claim 13, wherein:
    the virtual boundary comprises a geofence associated with the target computing device; and
    the network filter further executes instructions to capture positional data corresponding to at least one of global positioning system (GPS) data associated with the target computing device, data indicative of a wireless signal strength of the target computing device, or data indicative of a cellular signal strength of the target computing device.

15. The non-transitory computer-readable medium of claim 14, wherein the security action comprises:
    determining, based on the analysis of the captured positional data, that the target computing device has exited an established geofence; and
    presenting, to a user of a different computing device, a notification that the target computing device has exited the established geofence.

16. The non-transitory computer-readable medium of claim 13, wherein the one or more computer-executable instructions further cause the computing device to:
    transmit a request to add the unidentified person to the social fence, wherein the request is accompanied by the audio clip; and
    in response to receiving an approval of the request from the different computing device, add the unidentified person to the social fence.

17. The non-transitory computer-readable medium of claim 13, wherein the computer-executable instructions further cause the computing device to:
    store the task in a shared location for execution at a later point in time.

18. The non-transitory computer-readable medium of claim 17, wherein the computer-executable instructions further cause the computing device to:
    execute, at the later point in time via a background process running on the target computing device, the task from the shared location.

* * * * *